(12) United States Patent
Rauniyar et al.

(10) Patent No.: US 12,482,116 B2
(45) Date of Patent: Nov. 25, 2025

(54) METHOD OF MULTIPLE IMAGE RECONSTRUCTION AND REGISTRATION

(71) Applicant: BOSTON SCIENTIFIC SCIMED, INC., Maple Grove, MN (US)

(72) Inventors: Niraj Prasad Rauniyar, Plymouth, MN (US); Robert J. Riker, Sewickley, PA (US); Longquan Chen, Andover, MA (US); Matthew J. Strong, Two Rivers, WI (US)

(73) Assignee: BOSTON SCIENTIFIC SCIMED, INC., Maple Grove, MN (US)

( * ) Notice: Subject to any disclaimer, the term of this patent is extended or adjusted under 35 U.S.C. 154(b) by 328 days.

(21) Appl. No.: 17/940,518

(22) Filed: Sep. 8, 2022

(65) Prior Publication Data

US 2023/0081476 A1    Mar. 16, 2023

Related U.S. Application Data

(60) Provisional application No. 63/242,540, filed on Sep. 10, 2021.

(51) Int. Cl.
*G06T 7/33*     (2017.01)
*A61B 1/00*     (2006.01)
(Continued)

(52) U.S. Cl.
CPC .......... *G06T 7/337* (2017.01); *A61B 1/00009* (2013.01); *A61B 1/04* (2013.01);
(Continued)

(58) Field of Classification Search
CPC ........... G06T 7/337; G06T 7/593; G06T 7/73; G06T 2207/10012; G06T 2207/10068;
(Continued)

(56) References Cited

U.S. PATENT DOCUMENTS 10,022,074 B2   7/2018   Shigeta
10,031,070 B2   7/2018   Chiba
(Continued)

OTHER PUBLICATIONS

Dib et al; "A Real Time Visual SLAM for RGB-D Cameras based on Chamfer Distance and Occupancy Grid," 2014 IEEE/ASME International Conference on Advanced Intelligent Mechatronics (AIM) Besancon, France, 6 pages, Jul. 8-11, 2014.
(Continued)

*Primary Examiner* — Richard T Torrente
(74) *Attorney, Agent, or Firm* — Seager, Tufte & Wickhem, LLP (57) ABSTRACT

Systems and methods related to combing multiple images are disclosed. An example method of combining multiple images of a body structure includes capturing a first input image with a digital camera positioned at a first location at a first time point, representing the first image with a first plurality of pixels, capturing a second input image with the digital camera positioned at a second location at a second time point, representing the second image with a second plurality of pixels, generating a first feature distance map of the first input image, generating a second feature distance map of the second input image, calculating the positional change of the digital camera between the first time point and the second time point and utilizing the first feature distance map, the second feature distance map and the positional change of the digital camera to generate a three-dimensional surface approximation the body structure.

20 Claims, 7 Drawing Sheets

(51) Int. Cl.
*A61B 1/04* (2006.01)
*G06T 7/593* (2017.01)
*G06T 7/73* (2017.01)

(52) U.S. Cl.
CPC ............ *G06T 7/593* (2017.01); *G06T 7/73* (2017.01); *G06T 2207/10012* (2013.01); *G06T 2207/10068* (2013.01); *G06T 2207/20221* (2013.01); *G06T 2207/30244* (2013.01)

(58) Field of Classification Search
CPC .......... G06T 2207/20221; G06T 2207/30244; G06T 2207/30004; G06T 7/0012; G06T 7/30; G06T 7/50; G06T 2207/20041; A61B 1/00009; A61B 1/04; H04N 13/111; H04N 2013/0081
See application file for complete search history.

(56) References Cited

U.S. PATENT DOCUMENTS

| | | | |
|---|---|---|---|
| 10,051,193 B2 | 8/2018 | Kagawa et al. | |
| 10,092,192 B2 | 10/2018 | Lashkari et al. | |
| 10,123,684 B2 | 11/2018 | Sidar et al. | |
| 10,198,872 B2 | 2/2019 | Lurie et al. | |
| 10,231,600 B2 | 3/2019 | Ikemoto et al. | |
| 10,617,282 B2 | 4/2020 | Kuriyama | |
| 10,722,105 B2 | 7/2020 | Kobayashi et al. | |
| 10,729,310 B2 | 8/2020 | Takahashi | |
| 10,765,295 B2 | 9/2020 | Takahashi | |
| 2011/0019035 A1 | 1/2011 | Satodate | |
| 2012/0220840 A1 | 8/2012 | Morita et al. | |
| 2015/0363942 A1 | 12/2015 | Mitsui | |
| 2021/0244260 A1* | 8/2021 | Uyama | G02B 27/646 |
| 2021/0366142 A1* | 11/2021 | Grossinger | H04N 13/254 |
| 2023/0009683 A1* | 1/2023 | Biran | H04N 13/156 |
| 2023/0237696 A1* | 7/2023 | Inoue | G06T 5/50 |
| | | | 345/633 |

OTHER PUBLICATIONS

Lam et al; "Thinning Methodologies—A Comprehensive Survey," IEEE Transactions on Pattern Analysis and Machine Intelligence, vol. 14, No. 9, 18 pages, Sep. 1992.

Mahmoud et al; "OrbSlam-based Endoscope Tracking and 3D Reconstruction," 14 pages, Aug. 29, 2016.

Usami et al; "Polyp Shape Recovery Based on Blood Vessel Structure Analysis," International Conference on Knowledge Based and Intelligent Information and Engineering Systems, KES2017, Marseille, France, 8 pages, Sep. 6-8, 2017.

Van Herk, "Image Registration Using Chamfer Matching," Elsevier, Inc. 14 pages, 2008.

International Search Report and Written Opinion for International Search Report PCT/US2022/042890, date of mailing Dec. 15, 2022, 13 pages.

* cited by examiner

METHOD OF MULTIPLE IMAGE RECONSTRUCTION AND REGISTRATION

CROSS REFERENCE TO RELATED APPLICATIONS

This application claims the benefit of and priority to U.S. Provisional Patent Application Ser. No. 63/242,540 filed on Sep. 10, 2021, the disclosure of which is incorporated herein by reference.

TECHNICAL FIELD

The present disclosure relates to image processing techniques and more particularly, to registering and reconstructing multiple images captured during a medical procedure, whereby the process of registering and reconstructing an imaged scene utilizes unique features of the scene to accurately display the captured image while minimizing computational requirements.

BACKGROUND

Various medical device technologies are available to medical professionals for use in viewing and imaging internal organs and systems of the human body. For example, a medical endoscope equipped with a digital camera may be used by physicians in many fields of medicine to view parts of the human body internally for examination, diagnosis, and during treatment. For example, a physician may utilize a digital camera coupled to an endoscope to view the treatment of a kidney stone during a lithotripsy procedure.

However, during some portions of a medical procedure, the images captured by the camera may experience a variety of complex exposure sequences and different exposure conditions. For example, during a lithotripsy procedure, a physician may view a live video stream captured by a digital camera positioned adjacent to a laser fiber being used to pulverize a kidney stone. It can be appreciated that to assure the medical procedure is performed in an efficient manner, the physician (or other operator) needs to visualize the kidney stone in an appropriate field of view. For example, the images captured by the digital camera positioned adjacent the kidney stone need to accurately reflect the size of the kidney stone. Knowing the physical size of a kidney stone (and/or residual stone fragments) may directly impact procedural decision making and overall procedural efficiency. In some optical imaging systems (e.g., monocular optical imaging systems), the image sensor pixel size may be fixed, and therefore, the physical size of the objects being displayed depends on the distance of the object from the collection optic. In such instances, two objects of identical size may appear to be different in the same image, whereby the object further from the optic may appear smaller than the second object. Therefore, when analyzing video imagery in a medical procedure, it may be useful to accumulate data from multiple image frames, which may include changes to the image "scene" in addition to changes in the camera viewpoint. This accumulated data may be used to reconstruct a three-dimensional representation of the imaged area (e.g., the size and volume of a kidney stone or other anatomical feature). Therefore, it may be desirable to develop image processing algorithms which register video frames and reconstruct the imaged environment, thereby improving the clarity and accuracy of the visual field observed by a physician during a medical procedure. Image processing algorithms which utilize image registering and reconstruction techniques (while minimizing computational processing requirements) to enhance multi-exposure images are disclosed.

BRIEF SUMMARY

This disclosure provides design, material, manufacturing method, and use alternatives for medical devices. An example method of combining multiple images of a body structure includes capturing a first input image with a digital camera positioned at a first location at a first time point, representing the first image with a first plurality of pixels, capturing a second input image with the digital camera positioned at a second location at a second time point, representing the second image with a second plurality of pixels, generating a first feature distance map of the first input image, generating a second feature distance map of the second input image, calculating the positional change of the digital camera between the first time point and the second time point and utilizing the first feature distance map, the second feature distance map and the positional change of the digital camera to generate a three-dimensional surface approximation the body structure.

Alternatively or additionally to any of the embodiments above, wherein the first image corresponds to the body structure, and wherein generating the first feature distance map includes selecting one or more pixels from the first plurality of pixels, wherein the one or more pixels from the first plurality of pixels are selected based on their proximity to a feature of the first image.

Alternatively or additionally to any of the embodiments above, wherein the one or more pixels from the first plurality of pixels are selected based on their proximity to a central longitudinal axis of the body structure.

Alternatively or additionally to any of the embodiments above, wherein the second image corresponds to the body structure, and wherein generating the second feature distance map includes selecting one or more pixels from the second plurality of pixels, wherein the one or more pixels from the second plurality of pixels are selected based on their proximity to a feature of the second image.

Alternatively or additionally to any of the embodiments above, wherein the one or more pixels from the second plurality of pixels are selected based on their proximity to a central longitudinal axis of the body structure.

Alternatively or additionally to any of the embodiments above, wherein generating the first feature distance map includes calculating rectilinear distances from a portion of the body structure to one or more pixels of the first image.

Alternatively or additionally to any of the embodiments above, wherein generating the second feature distance map includes calculating rectilinear distances from a portion of the body structure to the one or more pixels of the second image.

Alternatively or additionally to any of the embodiments above, wherein generating the first feature distance map includes assigning a numerical value to the one or more pixels of the first plurality of pixels.

Alternatively or additionally to any of the embodiments above, wherein generating the second feature distance map includes assigning a numerical value to the one or more pixels of the second plurality of pixels.

Alternatively or additionally to any of the embodiments above, wherein the first plurality of pixels are arranged in a first coordinate grid, and wherein second plurality of pixels are arranged in a second coordinate grid, and wherein the coordinate locations of the first plurality of pixels are at the same respective locations as the coordinate locations of the second plurality of pixels.

Alternatively or additionally to any of the embodiments above, further comprising generating a hybrid feature distance map by registering the first feature distance map with the second feature distance map using one or more degrees of freedom corresponding to a digital camera motion configuration parameter.

Alternatively or additionally to any of the embodiments above, wherein the digital camera motion parameter includes one or more of a positional change and a rotational change of the digital camera along a scope axis.

Alternatively or additionally to any of the embodiments above, further comprising assessing the confidence of the hybrid distance map by comparing the value of distances calculated in the hybrid distance map to a threshold distance value.

Another example method of combining multiple images of a body structure includes using an image capture device to obtain a first image at a first time point and to obtain a second image at a second time point, wherein the image capture device is positioned at a first position when it captures the first image at the first time point, and wherein the image capture device is positioned at a second position when it captures the second image at the second time point, and wherein the second time point occurs after the first time point. The example method further includes representing the first image with a first plurality of pixels, representing the second image with a second plurality of pixels, generating a first feature distance map of the first input image, generating a second feature distance map of the second input image, calculating the positional change of the digital camera between the first time point and the second time point, utilizing the first feature distance map, the second feature distance map and the positional change of the digital camera to generate a three-dimensional surface approximation the body structure.

Alternatively or additionally to any of the embodiments above, wherein the first image corresponds to the body structure, and wherein generating the first feature distance map includes selecting one or more pixels from the first plurality of pixels, wherein the one or more pixels from the first plurality of pixels are selected based on their proximity to a features of the first image correlated to body structures.

Alternatively or additionally to any of the embodiments above, wherein the one or more pixels from the first plurality of pixels are selected based on their proximity to a central longitudinal axis of the body structure.

Alternatively or additionally to any of the embodiments above, wherein the second image corresponds to the body structure, and wherein generating the second feature distance map includes selecting one or more pixels from the second plurality of pixels, wherein the one or more pixels from the second plurality of pixels are selected based on their proximity to a feature of the second image body structure.

Alternatively or additionally to any of the embodiments above, wherein the one or more pixels from the second plurality of pixels are selected based on their proximity to a central longitudinal axis of the body structure.

Alternatively or additionally to any of the embodiments above, further comprising generating a hybrid feature distance map by registering the first feature distance map with the second feature distance map using a one or more degrees of freedom corresponding to a digital camera motion parameter and a scope state configuration parameter.

Another example system for generating a fused image from multiple images includes a processor and a non-transitory computer-readable storage medium including code configured to perform a method of fusing images. The method also includes capturing a first input image with a digital camera positioned at a first location at a first time point, representing the first image with a first plurality of pixels, capturing a second input image with the digital camera positioned at a second location at a second time point, representing the second image with a second plurality of pixels, generating a first feature distance map of the first input image, generating a second feature distance map of the second input image, calculating the positional change of the digital camera between the first time point and the second time point and utilizing the first feature distance map, the second feature distance map and the positional change of the digital camera to generate a three-dimensional surface approximation the body structure.

The above summary of some embodiments is not intended to describe each disclosed embodiment or every implementation of the present disclosure. The Figures, and Detailed Description, which follow, more particularly exemplify these embodiments.

BRIEF DESCRIPTION OF THE DRAWINGS

The disclosure may be more completely understood in consideration of the following detailed description in connection with the accompanying drawings, in which.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DETAILED DESCRIPTION

For the following defined terms, these definitions shall be applied, unless a different definition is given in the claims or elsewhere in this specification.

All numeric values are herein assumed to be modified by the term "about", whether or not explicitly indicated. The term "about" generally refers to a range of numbers that one of skill in the art would consider equivalent to the recited value (e.g., having the same function or result). In many instances, the terms "about" may include numbers that are rounded to the nearest significant figure.

The recitation of numerical ranges by endpoints includes all numbers within that range (e.g., 1 to 5 includes 1, 1.5, 2, 2.75, 3, 3.80, 4, and 5).

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include one or more particular features, structures, and/or characteristics. However, such recitations do not necessarily mean that all embodiments include the particular features, structures, and/or characteristics. Additionally, when particular features, structures, and/or characteristics are described in connection with one embodiment, it should be understood that such features, structures, and/or characteristics may also be used connection with other embodiments whether or not explicitly described unless clearly stated to the contrary.

The following detailed description should be read with reference to the drawings in which similar elements in different drawings are numbered the same. The drawings, which are not necessarily to scale, depict illustrative embodiments and are not intended to limit the scope of the disclosure.

Image processing methods performed on images collected via a medical device (e.g., an endoscope) during a medical procedure are described herein. Further, the image processing methods described herein may include image registration and reconstruction algorithms. Various embodiments are disclosed for generating an improved image registration and reconstruction method that accurately reconstructs a three-dimensional image of an imaged area, while minimizing computational processing requirements. Specifically, various embodiments are directed to utilizing illumination data to provide information about image scene depths and surface orientations. For example, methods disclosed herein may use algorithms to extract vessel central axis locations and utilize chamfer matching techniques to optimize the registration process between two or more images. Further, because the medical device collecting the images (e.g., an endoscope) shifts positions while collecting images (over the time period of a medical procedure), the degrees of freedom (DOF) inherent to objects moving with the field of view of the endoscope may be leveraged to improve the optimization process of the registration algorithm. For example, image processing algorithms disclosed herein may utilize data representing the movement of the camera over a time period, whereby the data representing the positional change of the camera may be utilized to reconstruct a three-dimensional depiction of the imaged scene.

During a medical procedure (e.g., a ureteroscopic procedure), accurate representations of the depth perception of a digital image is important for procedural efficiency. For example, having an accurate representation of objects within the imaged field of view (e.g., the size of kidney stone within a displayed image) is critical for procedural decision making. Further, the size estimation via digital imaging is directly related to depth estimations. For example, the image obtained from a digital sensor is only two-dimensional in nature. To obtain an accurate volume estimation and/or an accurate scene reconstruction, the collected images may need to be evaluated from multiple viewpoints. Further, after collecting multiple images from various viewpoints (including positional changes of the camera), multiple image frames may be registered together to generate a three-dimensional depiction of the anatomical scene. It can be appreciated that the process of registering multiple image frames together may be exaggerated by motion of a patient's anatomy, as well as the inherent motion of an operator (e.g., a physician) which is operating the image collection device (e.g., digital camera positioned within the patient). As discussed above, understanding the movement of the camera from frame to frame may provide an accurate depth estimation for each pixel utilized to represent the three-dimensional scene.

With any imaging system, to accurately interpret the image, it may be important for an operator (e.g., a physician) to know the actual physical size of an object being displayed. For optical imaging systems imaging a two-dimensional scene at a fixed point in space, this is commonly achieved by calibrating the optical parameters of the system (e.g., focus length and distortion) and using that information to compute a pixel size (which may be frequently displayed using scale bars). However, this may not be possible in "monocular" optical imaging systems that image a three-dimensional scene with significant depth. In these systems, while the image sensor pixel size may be fixed, the physical size of the object being displayed will depend on the distance of that object from the collection optics (e.g., the distance of the object from the distal end of an endoscope). For example, in some optical imaging systems, two objects of identical size may appear to be different in the image, whereby the object further from the collection optic may appear smaller than an object closer to the collection optic. Therefore, when analyzing video imagery, it may be beneficial to collect data from multiple image frames, which may include changes to the imaged scenes as well as changes in the camera viewpoint.

In some imaging systems, the size of the field of view is estimated by comparing an object of unknown size to an object of known size. For example, during a lithotripsy procedure, the size of the field of view may be estimated by comparing the size of a laser fiber to that of a kidney stone. However, it may take a significant amount of time for physicians to develop the ability to make the comparative estimations due to the inherent size limitations of conventional camera systems utilized in endoscopic procedures. These limitations may result in imaging configurations having variable magnification of the object over the scene, whereby each pixel detected by the camera's sensor may represent a different physical size on the object.

As discussed above, when analyzing video imagery, it may be useful to accumulate data from multiple image frames (which may include changes to the imaged scene) and/or changes in the camera viewpoint. For example, a camera position change between two frames may permit relative depth measurements of scene objects to be made if the pixels corresponding to those objects' features are identified in both frames. While the mapping of corresponding pixels in two images is very useful, it is often difficult and computationally complex to do for a significant number of image features.

However, while collecting images with a relatively small medical device (such as an endoscope) may present challenges, endoscopic imaging may also provide unique advantages that may be leveraged for efficient multiple image registration. For example, because an endoscopic scene (e.g., collecting images of a kidney stone within a kidney) is generally lit by a single light source with a known and fixed relationship to the camera, illumination data may provide an additional source of information about image depths and surface orientations. Further, alternative techniques which incorporate the local environment (such as surface vasculature of the body cavity in which the image collection device is positioned) may be leveraged.

Figure 1:
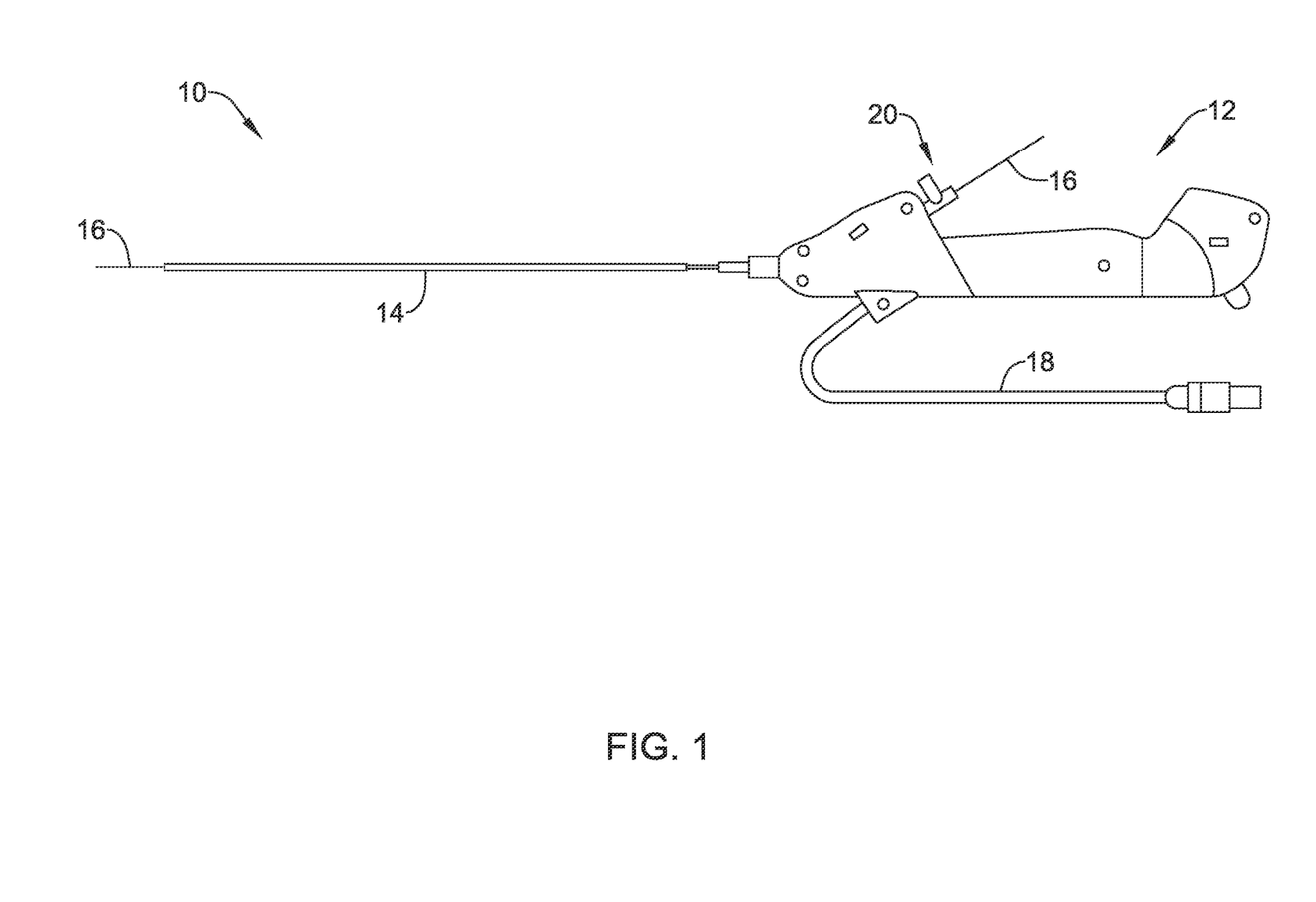
FIG. 1 is a schematic illustration of an example endoscopic system.

A description of a system for combining multi-exposure images to register and reconstruct multiple images is described below. FIG. 1 illustrates an example endoscopic system that may be used in conjunction with other aspects of the disclosure. In some embodiments, the endoscopic system may include an endoscope 10. The endoscope 10 may be specific to a particular endoscopic procedure, such as, e.g., ureteroscopy, lithotripsy, etc. or may be a general-purpose device suitable for a wide variety of procedures. In some embodiments, the endoscope 10 may include a handle 12 and an elongate shaft 14 extending distally therefrom, wherein the handle 12 includes a port configured to receive a laser fiber 16 extending within the elongate shaft 14. As illustrated in FIG. 1, the laser fiber 16 may be passed into a working channel of the elongate shaft 14 through a connector 20 (e.g., a Y-connector) or other port positioned along the distal region of the handle 12. It can be appreciated that the laser fiber 16 may deliver laser energy to a target site within the body. For example, during a lithotripsy procedure, the laser fiber 16 may deliver laser energy to pulverize a kidney stone.

Additionally, the endoscopic system shown in FIG. 1 may include a camera and/or lens positioned at the distal end of the elongate shaft 14. The elongate shaft and/or camera/lens may have deflection and/or articulation capabilities in one or more directions for viewing patient anatomy. In some embodiments, the endoscope 10 may be a ureteroscope. However, other medical devices, such as a different endoscope or related system, may be used in addition to or in place of a ureteroscope. Further, in some embodiments, the endoscope 10 may be configured to deliver fluid from a fluid management system to a treatment site via the elongate shaft 14. The elongate shaft 14 may include one or more working lumens for receiving a flow of fluid and/or other medical devices therethrough. In some embodiments, the endoscope 10 may be connected to the fluid management system via one or more supply lines.

In some embodiments, the handle 12 of the endoscope 10 may include a plurality of elements configured to facilitate the endoscopic procedure. In some embodiments, a cable 18 may extend from the handle 12 and is configured for attachment to an electronic device (not pictured) (e.g., a computer system, a console, a microcontroller, etc.) for providing power, analyzing endoscopic data, controlling the endoscopic intervention, or performing other functions. In some embodiments, the electronic device to which the cable 18 is connected may have functionality for recognizing and exchanging data with other endoscopic accessories.

In some embodiments, image signals may be transmitted from the camera at the distal end of the endoscope through the cable 18 to be displayed on a monitor. For example, as described above, the endoscopic system shown in FIG. 1 may include at least one camera to provide a visual feed to the user on the display screen of a computer workstation. It can be appreciated that, while not explicitly shown, the elongate shaft 14 may include one or more working lumens within which a data transmission cable (e.g., fiber optic cable, optic cable, connector, wire, etc.) may extend. The data transmission cable may be connected to the camera described above. Further, the data transmission cable may be coupled to the cable 18. Further yet, the cable 18 may be coupled to the computer processing system and display screen. Images collected by the camera may be transmitted through a data transmission cable positioned within the elongate shaft 14, whereby the image data then passes through the cable 18 to the computer processing workstation.

In some embodiments, the workstation may include a touch panel computer, an interface box for receiving the wired connection (e.g., the cable 18), a cart, and a power supply, among other features. In some embodiments, the interface box may be configured with a wired or wireless communication connection with the controller of the fluid management system. The touch panel computer may include at least a display screen and an image processor, and in some embodiments, may include and/or define a user interface. In some embodiments, the workstation may be a multi-use component (e.g., used for more than one procedure) while the endoscope 10 may be a single use device, although this is not required. In some embodiments, the workstation may be omitted and the endoscope 10 may be electronically coupled directly to the controller of the fluid management system.

Figure 2:
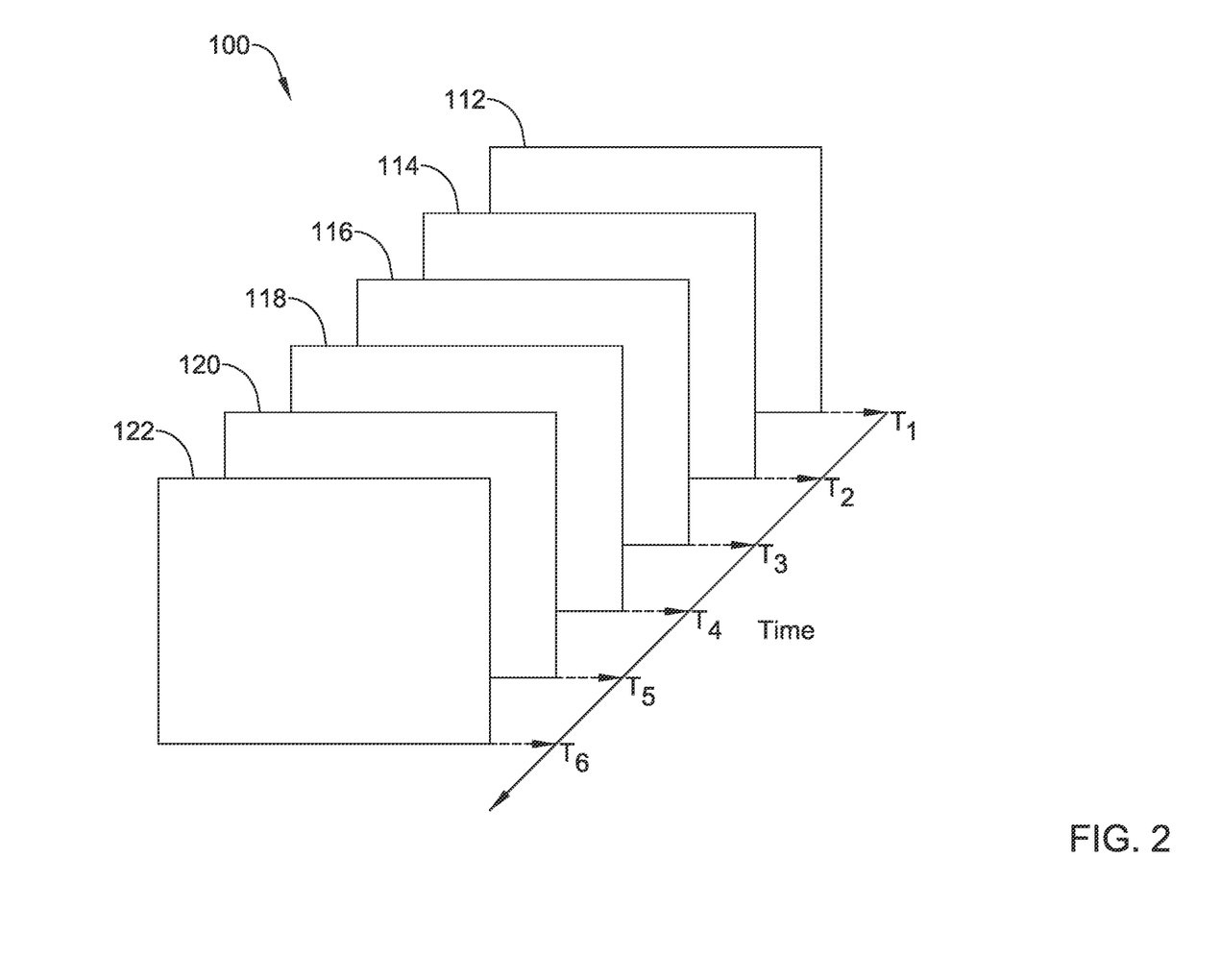
FIG. 2 illustrates a sequence of images collected by digital camera over a time period.

FIG. 2 illustrates a plurality of images 100 captured in sequence by a camera over a time period. It can be appreciated that the images 100 may represent a sequence of images captured during a medical procedure. For example, the images 100 may represent a sequence of images captured during a lithotripsy procedure in which a physician utilizes a laser fiber to treat a kidney stone. In some instances, the images captured by the digital camera may be captured in the green channel. Capturing the images in the green channel may be beneficial because the green channel may include the best spatial resolution in typical color camera filters (e.g., Bayer filters).

It can be further appreciated that the images 100 may be collected by an image processing system which may include, for example, a computer workstation, laptop, a tablet, or other computing platform that includes a display through which a physician may visualize the procedure in real-time. During the real-time collection of images 100, the image processing system may be designed to process and/or enhance a given image based on the fusion of one or multiple images taken subsequent to a given image. The enhanced images may then be visualized by the physician during the procedure.

As discussed above, it can be appreciated that the images 100 illustrated in FIG. 2 may include images captured with an endoscopic device (e.g., an endoscope) during a medical procedure (e.g., during a lithotripsy procedure). Further, it can be appreciated that the images 100 illustrated in FIG. 2 may represent a sequence of images 100 captured over time. For example, the image 112 may represent an image captured at time point $T_1$, while the image 114 may represent an image captured at time point $T_2$, whereby the image 114 captured at time point $T_2$ occurs after the image 112 captured at time point $T_1$. Further, the image 116 may represent an image captured at time point $T_3$, whereby the image 116 captured time point $T_3$ occurs after the image 114 captured at time point $T_2$. This sequence may progress for the images 118, 120 and 122 taken at time points $T_4$, $T_5$ and $T_6$, respectively, where time point $T_4$ occurs after time point $T_5$, time point $T_5$ occurs after time point $T_4$, and time point $T_6$ occurs after time point $T_5$.

It can further be appreciated that the images 100 may be captured by a camera of an endoscopic device positioned during a live event. For example, the images 100 may be captured by a digital camera positioned within a body vessel during a medical procedure. Therefore, it can further be appreciated that while the camera's field of view remains constant during the procedure, the images that are generated during the procedure may change due to the dynamic nature of the procedure being captured by the images. For example, the image 112 may represent an image taken at a time point just before a laser fiber emits laser energy to pulverize a kidney stone. Further, the image 114 may represent an image taken at a time point just after a laser fiber emits laser energy to pulverize the kidney stone. It can further be appreciated that after the laser imparts energy to the kidney stone, various particles from the kidney stone may move quickly through the camera's field of view. Additionally, it can be appreciated that over the time period in which the camera collects the images 100, the position of the camera may change (while collecting the images 100). As discussed herein, the positional change of the camera may provide data which may contribute to generating accurate three-dimensional reconstructed image scenes.

It can be appreciated that a digital image (such as any one of the plurality of images 100 shown in FIG. 1) may be represented as a collection of pixels (or individual picture elements) arranged in a 2-dimensional grid, represented using squares. Further, each individual pixel making up an image may be defined as the smallest item of information in the image. Each pixel is a small sample of the original image, where more samples typically provide more-accurate representations of the original.

Figure 3:
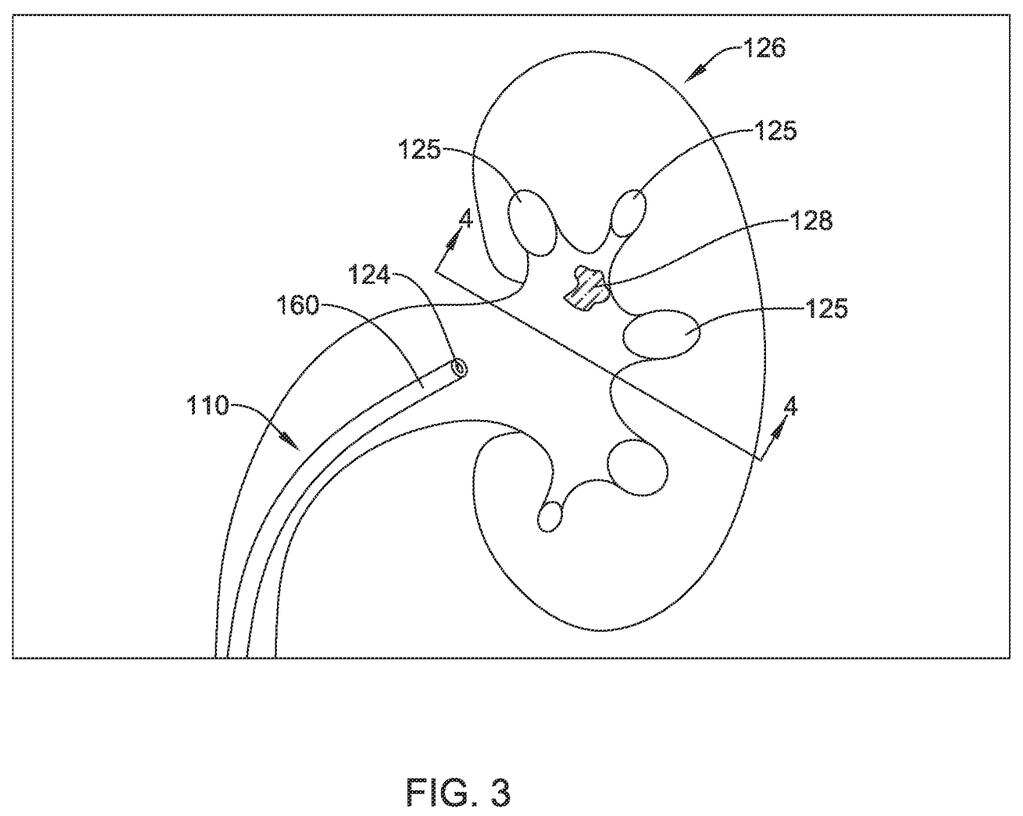
FIG. 3 illustrates an example optical imaging system capturing an image in an example medical procedure.

FIG. 3 illustrates an example endoscope 110 positioned within a kidney 129. It can be appreciated that while FIG. 3 and the related discussion may be directed to images taken within the kidney, the techniques, algorithms and/or methodologies disclosed herein may be applied to images collected and processed in any body structure (e.g., body lumens, cavities, organs, etc.)

The example endoscope 110 illustrated in FIG. 3 may be similar in form and function to the endoscope 10 described above with respect to FIG. 1. For example, FIG. 3 illustrates the distal end region of the elongate shaft 160 of the endoscope 110 may include a digital camera 124. As described above, the digital camera 124 may be utilized to capture images of an object positioned in the example kidney 129. In particular, FIG. 3 illustrates a kidney stone 128 positioned downstream (within the kidney 129) of the distal end region of the elongate shaft 160 of the endoscope 110. Accordingly, the camera 124 positioned on the distal end region of the shaft 160 may be utilized to capture images of the kidney stone 128 as a physician performs a medical procedure (such as a lithotripsy procedure to break up the kidney stone 128). Additionally, FIG. 3 illustrates one or more calyx (cuplike extensions) distributed within the kidney 129.

Additionally, it can be appreciated that as the physician manipulates the endoscope 110 while performing the medical procedure, the digital camera 124, the kidney 129 and/or the kidney stone 128 may shift positions as the digital camera 124 captures images over a time period. Accordingly, images captured by the camera 124 over time may vary slightly relative to one another.

Figure 4A:
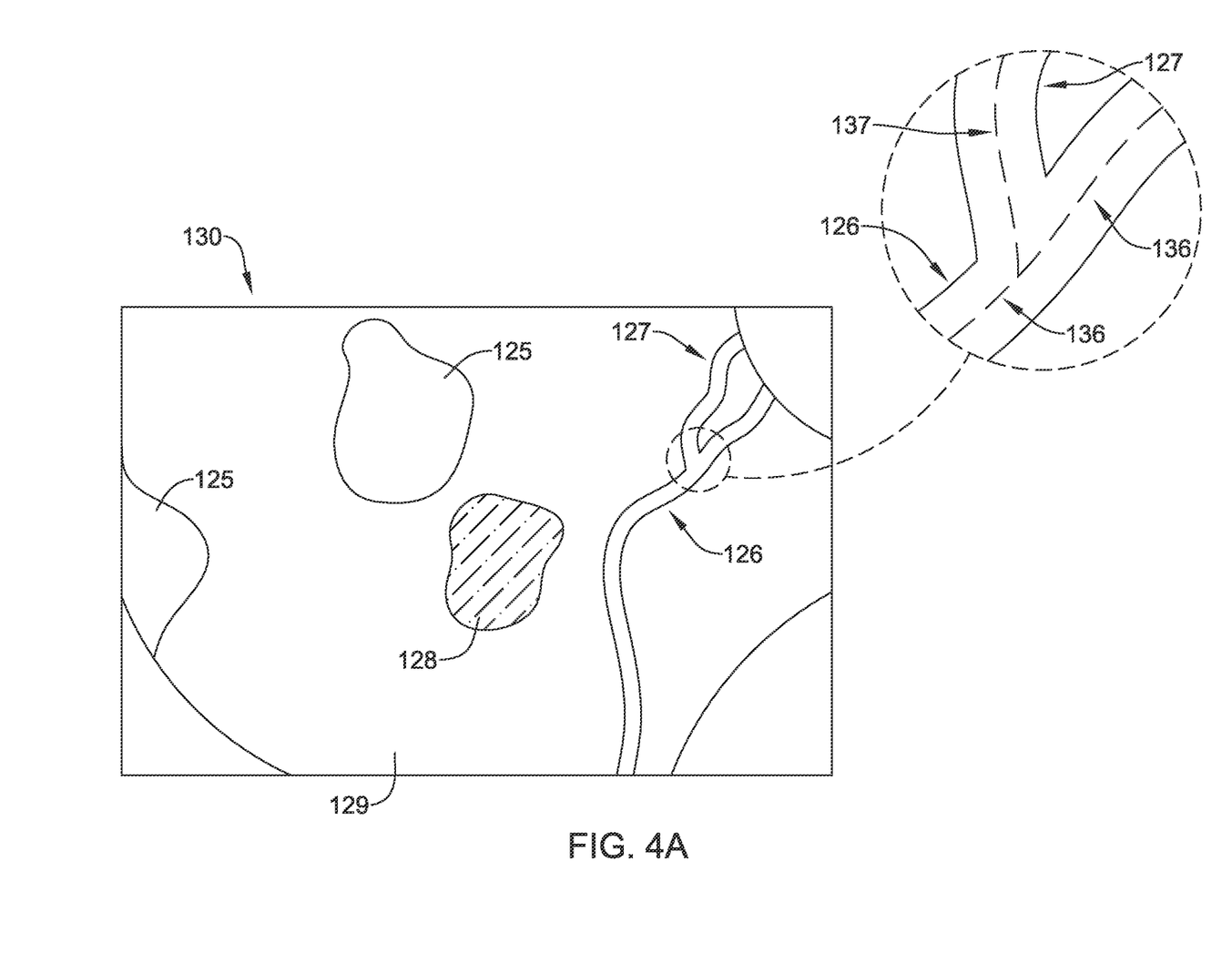
FIG. 4A illustrates a first image captured by the example optical imaging system of FIG. 3 at a first time point.
Figure 4B:
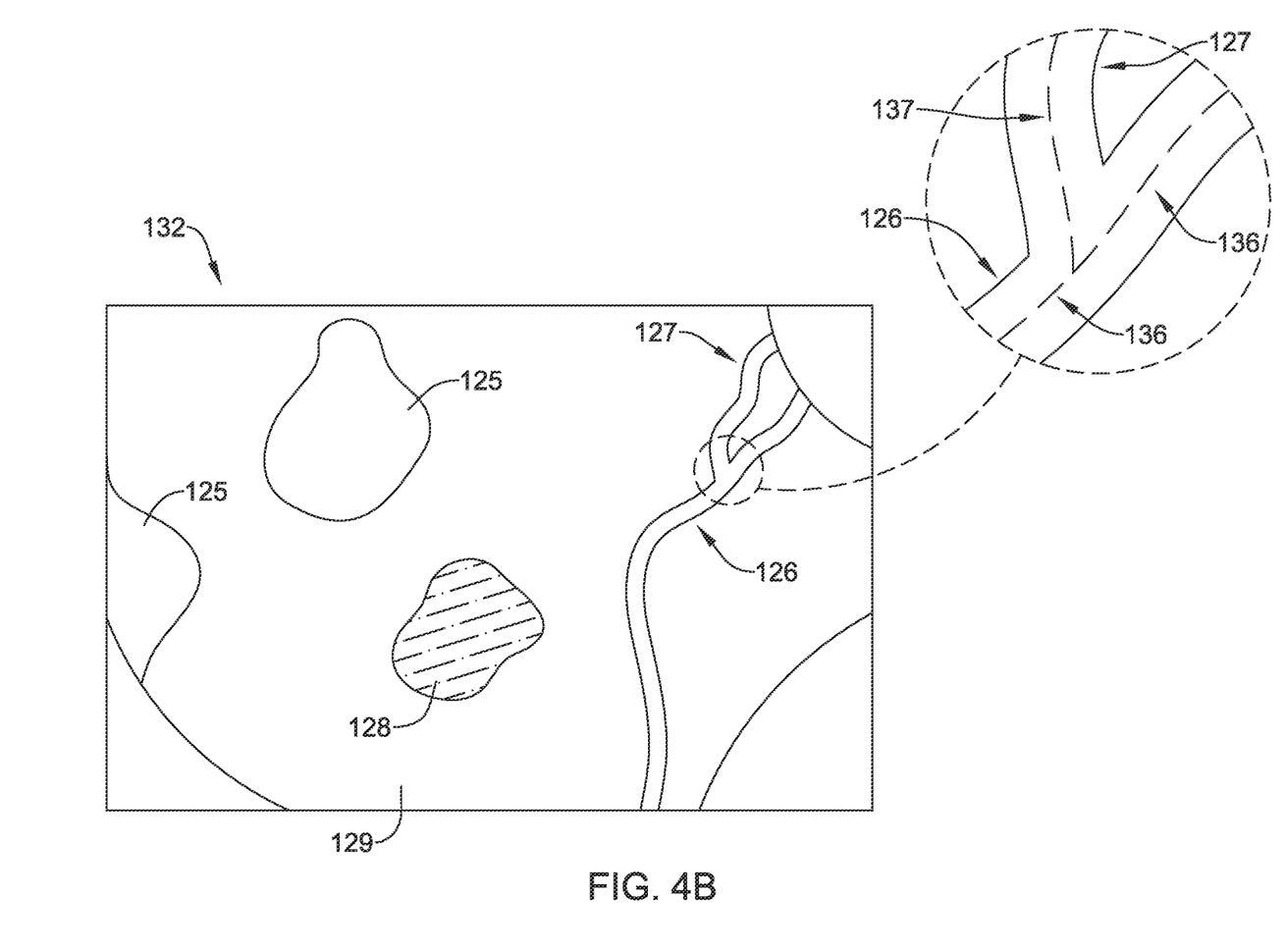
FIG. 4B illustrates a second image captured by the example optical imaging system of FIG. 3 at a second time point.

FIG. 4A illustrates a first image 130 taken by the digital camera 124 of the endoscope 110 along the line 4-4 of FIG. 3. It can be appreciated that the image 130 shown in FIG. 4A illustrates a cross-sectional image of the cavity of the kidney 129 taken along line 4-4 of FIG. 3. Accordingly, FIG. 4A illustrates the kidney stone 128 positioned within an inner cavity of the kidney 129 at a first time point. Further, FIG. 4B illustrates a second image 132 taken after the first image 130. In other words, FIG. 4B illustrates a second image 132 taken at a second time point which occurs after the first time point (the first time point corresponding to the time point at which image 130 was taken). It can be appreciated that during the time lapse between the first time point and the second time point, the position of the digital camera 124 may have changed. Accordingly, it can be appreciated that the change in position of the digital camera 124 is reflected in the differences between the first image 130 taken at the first time point and the second image 132 taken at the later time point.

The detailed view of FIG. 4A further illustrates that the kidney 129 may include a first blood vessel 126 including a central longitudinal axis 136. The blood vessel 126 may be adjacent to the kidney stone 128 and be visible on a surface of the inner cavity of the kidney 129. It can be appreciated that the central longitudinal axis 136 may represent the approximate central location of the cross-section of the blood vessel 126 (taken at any point along the length of the vessel 126). For example, as shown in FIG. 4A, the dashed line 136 is shown following the central longitudinal axis of the blood vessel 126. Further, FIG. 4A illustrates another example blood vessel 127 branching off the blood vessel 136, whereby the blood vessel 127 includes a central longitudinal axis 137.

It can be further appreciated that to generate an accurate, real-time representation of the position and size of the kidney stone 128 within the cavity of the kidney 129, a "hybrid" image may need to be constructed using data from both the first image 130 and the second image 132. In particular, the first image 130 may be registered with the second image 132 to reconstruct a hybrid image which accurately represents the position and size of the kidney stone 128 (or other structures) within the kidney 129. An example methodology to generate a hybrid image which accurately represents the position and size of the kidney stone 128 within the kidney 129 is provided below. Additionally, as will be described herein, the hybrid image generation may represent one step in the generation of an accurate three-dimensional reconstruction of the imaged scenes represented in FIGS. 4A and 4B. For example, the hybrid image may be utilized with the positional change data of the medical device 110 to generate a three-dimensional depiction of the image scenes.

High Performance Feature Maps for Registration

Figure 5:
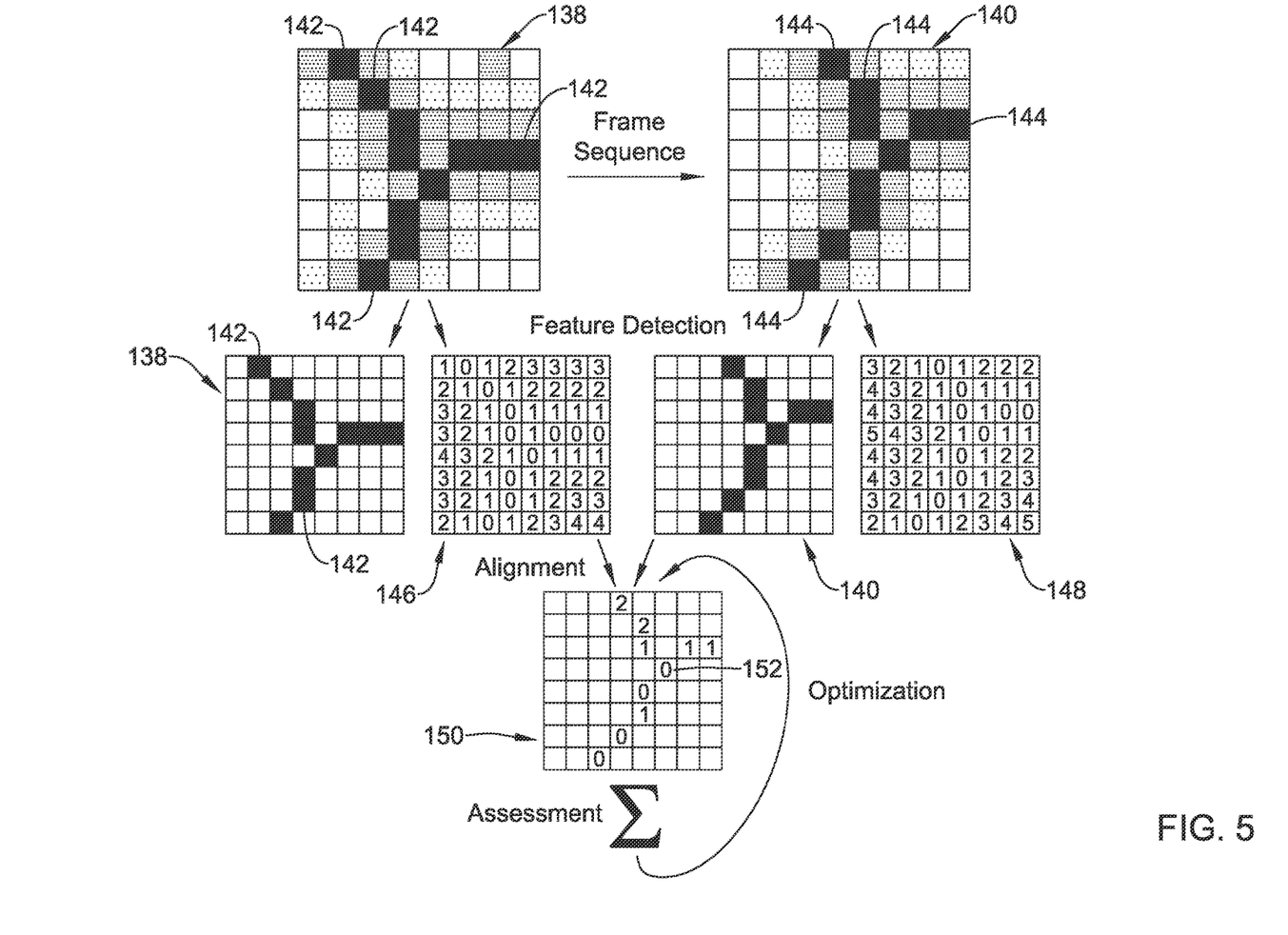
FIG. 5 is a block diagram of an image processing algorithm utilizing two image feature image maps to create an optimized feature map.

FIG. 5 illustrates an example algorithm which registers image 130 with image 132 to generate a hybrid image of the scene illustrated over the first time period and the second time period described above with respect to FIGS. 4A and 4B. For simplicity, the following discussion assumes that the image 130 and the image 132 are taken at a first time point and a second time (whereby the second time point follows the first time point). However, it can be appreciated that the following algorithm may utilize images taken at varying time points. For example, the following algorithm may be utilized to register the image 130 with a third image which is taken after the second image 132.

In general, the registration algorithm described herein extracts the vessel central axis locations (e.g., the vessel central axis location 136 described above) and calculates the transformation between a first image (e.g., image 130) and a second image (e.g., image 132) using chamfer matching. Further, it can be appreciated that branching vasculature is a prominent feature within the endoscopic landscape, and therefore, the registration algorithm described herein may focus on identifying and utilizing unique features of the vasculature such as curvilinear segments in a particular size range with light-dark-light transitions. These features may be best visualized in the green channel of the color image, as described above. However, it can be further appreciated that vessel edges are less well defined and stable given changes of viewpoint or lighting conditions versus central longitudinal axis estimations. Therefore, a "feature detection" algorithm which locates clusters of vessel central axis locations and simultaneously builds a map of rectilinear ("Manhattan") distances to those features may minimize both the number of computational operations and pixel data accesses required to sufficiently registering the images together. Further, pairs of image frames may be efficiently registered with a chamfer matching technique by assessing the distance map in a first image frame (e.g., image 130) at the locations of the central axis clusters of a subsequent image frame (e.g., image 132). This process may permit a fast assessment of feature registration which can be efficiently repeated many times in various candidate frame alignments. Bilinear interpolation of distances may be utilized where the cluster points and distance maps do not perfectly align.

FIG. 5 shows a graphical representation of the above "cluster alignment" processing step. It can be appreciated that a portion of a digital image may be represented as a collection of pixels (or individual picture elements) arranged in a 2-dimensional grid, represented using squares. FIG. 5 illustrates a first pixel grid 138 which may correspond to a collection of pixels clustered around the central axis 136 of the blood vessel 126 shown in image 130. For example, the cluster of pixels shown in grid 138 may correspond to a portion of the image 130 which is centered around the central axis 136 of the blood vessel 126. Similarly, FIG. 5 illustrates a second pixel grid 140 which may correspond to a collection of pixels clustered around the central axis 136 of the blood vessel 126 shown in image 132. For example, the cluster of pixels shown in grid 140 may correspond to a portion of the image 132 which is centered around the central axis 136 of the lumen 134. It can be appreciated that the blood vessel 126 may be the same blood vessel in both the first image 130 and the second image 132. However, because the position of the camera 124 may have changed, the collection of pixels (e.g., grid 138) representing the image of the blood vessel 126 in the first image 130 may differ from the collection of pixels (e.g., grid 140) representing the image of the blood vessel 126 in the second image 132.

Further, while the grids 138/140 illustrate a selected portion of the overall image captured by the medical device (e.g., the grids 138/140 illustrate a selected portion of the entire images 130/132 shown in FIGS. 4A and 4B, respectively), the algorithms described herein may be applied simultaneously to all the pixels utilized to define each of the images 130/132. It can be appreciated that each individual pixel making up an image may be defined as the smallest item of information in the image. However, while each pixel is a small sample of the original image, more samples (e.g., the entire collection of pixels defining an image) may provide more-accurate representations of the original.

Further, it can be appreciated that, for simplicity, the grid for each of the partial image 130 and the partial image 132 is sized to 8×8. In other words, the 2-dimensional grids for images 130/132 includes 8 columns of pixels extending vertically and 8 rows of pixels extending horizontally. It can be appreciated that the size of the images represented in FIG. 5 is exemplary. The size (total number of pixels) for digital images may vary. For example, the size of a pixel grid representing the entire image may be approximately several hundred by several hundred pixels (e.g., 250×250, 400× 400).

It can be appreciated that an individual pixel location may be identified via its coordinates (X,Y) on the 2-dimensional image grid. Additionally, comparison of adjacent pixels within a given image may yield desirable information about what portions of a given image an algorithm may seek to utilize when performing a registration process. For example, FIG. 5 illustrates that each grid 138/140 may include one or more "feature" pixels. These feature pixels may represent the pixels in each grid 138/140 which are closest to the central axis 136 of each image 130/132, respectively. It can be appreciated that the pixels making up the feature pixels are substantially darker as compared to the pixels which are adjacent to the feature pixels. For example, the feature pixels 142 in grid 138 and the feature pixels 144 in grid 140 are black. All other pixels adjacent to the feature pixels 142/144 are depicted as varying shades of grey (or white).

FIG. 5 further illustrates that each of the pixels in each respective pixel grid 138/140 may be assigned a numerical value corresponding to its relative distance to a feature pixel. In some instances, this methodology of assigning numerical values which correspond to the distance from a given pixel to a feature pixel may include building a feature map using rectilinear "Manhattan" distances. For example, FIG. 5 illustrates the feature pixels 142/144 of grid 138/140, respectively, may be assigned a numerical value of "0", grey variants assigned a value of "1" and white pixels assigned a value of "2", whereby the larger numerical value corresponds to a distance which is farther from a given feature pixel. It can be further appreciated the FIG. 5 illustrates the numerical representation of the pixel grid 138 is shown in grid 146, while the numerical representation of the pixel grid 138 is shown in grid 148.

As described herein, because the image 130 and the image 132 are taken at different time points, the feature pixels of the image 130 may be located in different coordinates than the feature pixels of image 132. Therefore, to generate a hybrid image which utilizes feature pixel data from both the image 130 and the image 132, an alignment process may be utilized to create a hybrid numerical grid 150 having feature pixels generated via the summation of each coordinate location of the numerical grid 138 and the numerical grid 148. It can be appreciated that the locations of the feature pixels in the hybrid numerical grid 150 will include those overlapping locations of feature pixels 142/144 of each grid 138/10, respectively (e.g., the coordinates in each grid 138/140 which share a feature pixel). For example, FIG. 5 illustrates that the coordinate location 4, 6 (row 4, column 6) of hybrid grid 150 includes a feature pixel 152 (identified via having a numerical value of "0") which is the sum of the value "0" (at coordinate location 4,6 of grid 138) and the value "0" (at coordinate location 4,6 of grid 140). The remaining feature pixels of the hybrid grid 150 may be identified by repeating this process across all coordinates of the grid 150. Further, as described herein, while FIG. 5 illustrates the summation process occurring with a selected group of pixel locations for each image 130/132, it can be appreciated that this alignment process may be performed across all the pixels in the images 130/132.

Additionally, it can be further appreciated that the feature pixels of the hybrid grid 150 may be optimized across multiple frames. For example, the first iteration of generating a hybrid numerical grid may provide an initial estimation of how "misaligned" the first image 130 is from the image 132. By continuing to iterate the algorithm across multiple registration hypotheses, in conjunction with an optimization process (e.g., Simplex), the individual parameters of the registration (e.g., translations, scales and rotation, for a rigid registration) are tuned to identify the combination with the best result.

Camera Based Limited-DOF Registration

It can be appreciated that regarding that within the "High Performance Feature Maps Registration" process described here, a computationally intensive step may be the iterative optimization "loop" which scales exponentially with the number of degrees of freedom (DOF) applied to the alignment process. For example, referring to the images 130 and 132 described herein, objects within the images (e.g., a kidney stone being pulverized) have six degrees of freedom which include the three dimensions (X, Y, Z) in which relative motion may take place and an additional three degrees of freedom corresponding to each axis of rotation along each dimension. However, the degrees of freedom inherent to any moving object may be utilized to improve the computational efficiency of the optimization loop. An example process flow methodology 200 to improve the computational efficiency of the optimization loop is described with respect to FIG. 6.

Figure 6:
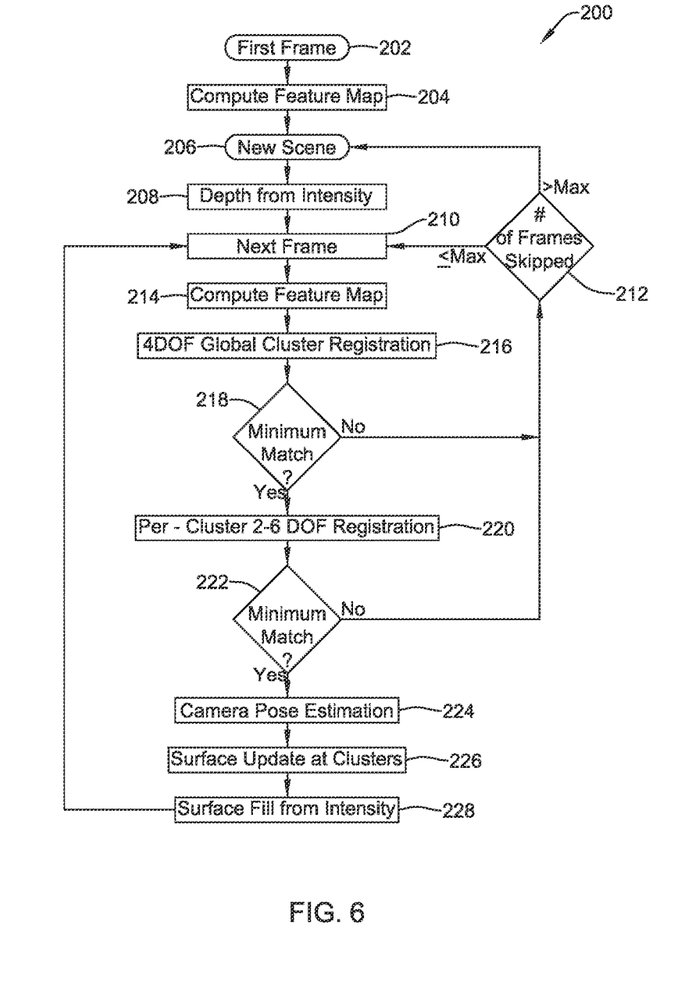
FIG. 6 is a block diagram of an image processing algorithm for registering multiple images.

FIG. 6 illustrates an example first step methodology to improve the computational efficiency of the optimization loop may include the digital camera (e.g., positioned on the distal end of an endoscope) capturing 202 a first image. An example second step may include computing 204 a "feature" map as described above in the "High Performance Feature Maps for Registration" section above. The output of the computation 204 of the feature map may include a grid including a numerical representations of feature elements (e.g., pixel clusters) which are positioned closest to the central axes of surface vessels, or similar image features, as described above.

An example next step in the methodology may include 208 an initial estimate of the depths of the various objects in the first image. This step may provide a preliminary approximation of the three-dimensional surface of the first image, whereby calculating the initial depth estimations may incorporate characteristics of the six degrees of freedom described herein. The preliminary approximation may include utilizing luminescence data to calculate a rough approximation of the three-dimensional surface of the first image.

An example next step in the methodology may include collecting 210 a subsequent image frame from the digital camera. Similar to that described above with respect to the first image, an example next step may include computing 214 a "feature" map for the second image as described above in the "High Performance Feature Maps for Registration." The output of the computation 214 of the feature map may include a grid including a numerical representations of feature elements (e.g., pixel clusters) which are positioned closest to the central axis of the vessel lumen in the second image.

An example next step 216 in the methodology may include chamfer matching of the pixel clusters of the first image feature map with the pixel clusters of the second image feature map. This step may include the chamfer matching process described above in the "High Performance Feature Maps for Registration" section. Additionally, this step may include registering the first image with the second image using four degrees of freedom, whereby the four degrees of freedom include the most likely motions of an endoscopic camera 124, such as advancement/withdrawal of the scope, rotation and flex (where flex change is a motion parameter) and/or current flex angle (where flex angle is a scope state estimate adjusted from frame to frame). It can be appreciated that this step may provide an initial approximation of the three-dimensional surface across the entire frame.

An example next step in the methodology may include assessing 218 the confidence of the initial registration of the first image with the second image which was calculated in the step 216. In some examples, this assessment may be made using a threshold for the value of the optimization cost function. For example, the threshold may include the total chamfer distance as determined in the "High Performance Feature Maps for Registration" section. As illustrated in the process 200, if the minimum threshold value is not met, a new "scene" may be initiated, whereby the new scene reinitializes data structures maintaining surface geometry and feature cluster correspondence. However, it is also contemplated that, alternatively to starting a new scene, the process may simply reject the current frame and proceed to the next, until a pre-determined maximum number of dropped frames triggers a scene reset.

After assessing the confidence of the initial registration (and provided the assessment meets a predetermined threshold), an example next step 220 in the methodology may include repeating the registration process for each feature elements pixel cluster, using only the pixels located in the immediate vicinity of each cluster. The degrees of freedom explored in the registration may be set according to any of three strategies. A first strategy may include a "fixed strategy," whereby a limited cluster size and robust initial estimates may permit the use of many degrees of freedom (e.g., the use of six degrees of freedom). Another strategy may include a "contextual" strategy, whereby the results of the registration from the initial registration step 216 (including the current scope flex angle estimate), the degrees of freedom may be tailored to an expected cluster distortion. For example, if the initial registration step 216 resulted in a change dominated by flex angle, a two degree of freedom registration may simply utilize only image translations in the X, Y directions. Additionally, another strategy may include an "adaptive" strategy, whereby fewer degrees of freedom registrations may be repeated with additional degree of freedom registrations, based on the registration quality indicators (e.g., optimization cost function). Registrations which are sufficiently parameterized may converge much more quickly than registrations with higher degree of freedom parameters when initiated from accurate initial estimates. This resulting registration (using any of the above strategies, may be deformable, as a set of independent affine cluster registrations with an interpolation strategy.

An example next step in the methodology may include assessing 222 the confidence of the individual cluster registrations against a threshold, whereby the number of clusters passing that threshold may itself be compared against a threshold. It can be appreciated that a given number of high-quality cluster matches is presumed to indicate a reliable registration within the scene. As illustrated in FIG. 6, if the minimum threshold value is not met, the process may start a new scene if the number of frames skipped has exceeded a maximum value, or alternatively, if the number of frames skipped is equal to or less than a maximum threshold, the process may abandon the current frame and advance to the next frame and begin computing the feature map (as described above with respect to step 214).

If the threshold value of the individual cluster registrations is met in the assessment 222 step above, an example next step may include combining 224 the cluster registrations to determine the most likely camera pose change occurring between frames and the resulting new endoscope flex angle estimation.

An example next step in the methodology may include calculating 224 depth estimations for the center of each cluster. The depth estimations for each cluster center may be translated to a three-dimensional surface position.

An example final step in the methodology may include estimating depth maps between and beyond clusters and factoring them into the scene surface descriptions.

After the cluster depth maps are estimated, any missing information needed to accurately represent the three-dimensional surface of an image may be approximated and filled in 228 between cluster centers using image intensity data. One possible approach is to parameterize this 2D interpolation and extrapolation with the sum of the intensity gradient along the paths separating the clusters, which assumes depth changes occur primarily in areas where image intensity is changing. Lastly, as new images are acquired the process may be repeated starting with computing 214 the feature map of the new image.

It should be understood that this disclosure is, in many respects, only illustrative. Changes may be made in details, particularly in matters of shape, size, and arrangement of steps without exceeding the scope of the disclosure. This may include, to the extent that it is appropriate, the use of any of the features of one example embodiment being used in other embodiments. The disclosure's scope is, of course, defined in the language in which the appended claims are expressed.

What is claimed is:

1. A method of combining multiple images of a body structure, the method comprising:
    capturing a first input image with a digital camera disposed along an endoscope inserted in a body lumen of a patient, wherein the digital camera is positioned at a first location within the body lumen at a first time point;
    representing the first image with a first plurality of pixels;
    capturing a second input image with the digital camera positioned at a second location within the body lumen at a second time point;
    representing the second image with a second plurality of pixels;
    generating a first feature distance map of the first input image;
    generating a second feature distance map of the second input image;
    calculating the positional change of the digital camera between the first time point and the second time point; and
    utilizing the first feature distance map, the second feature distance map and the positional change of the digital camera to generate a three-dimensional surface approximation of the body structure within the body lumen;
    wherein generating the first feature distance map includes assigning a numerical value to the one or more pixels of the first plurality of pixels;
    wherein generating the second feature distance map includes assigning a numerical value to the one or more pixels of the second plurality of pixels; and
    wherein utilizing the first feature distance map, the second feature distance map and the positional change of the digital camera to generate a three-dimensional surface approximation of the body structure includes calculating a transformation between the first input image and the second input image using a chamfer matching registration process.

2. The method of claim 1, wherein the first image corresponds to the body structure, and wherein generating the first feature distance map includes selecting one or more pixels from the first plurality of pixels, wherein the one or more pixels from the first plurality of pixels are selected based on their proximity to a feature of the first image.

3. The method of claim 2, wherein the one or more pixels from the first plurality of pixels are selected based on their proximity to a central longitudinal axis of the body structure.

4. The method of claim 3, wherein the second image corresponds to the body structure, and wherein generating the second feature distance map includes selecting one or more pixels from the second plurality of pixels, wherein the one or more pixels from the second plurality of pixels are selected based on their proximity to a feature of the second image.

5. The method of claim 4, wherein the one or more pixels from the second plurality of pixels are selected based on their proximity to a central longitudinal axis of the body structure.

6. The method of claim 1, wherein generating the first feature distance map includes calculating rectilinear distances from a portion of the body structure to one or more pixels of the first image and generating the second feature distance map includes calculating rectilinear distances from a portion of the body structure to the one or more pixels of the second image.

7. The method of claim 1, wherein the first plurality of pixels are arranged in a first coordinate grid, and wherein second plurality of pixels are arranged in a second coordinate grid, and wherein the coordinate locations of the first plurality of pixels are at the same respective locations as the coordinate locations of the second plurality of pixels.

8. The method of claim 1, further comprising generating a hybrid feature distance map by registering the first feature distance map with the second feature distance map using one or more degrees of freedom corresponding to a digital camera motion configuration parameter.

9. The method of claim 8, wherein the digital camera motion parameter includes one or more of a positional change and a rotational change of the digital camera along a scope axis.

10. The method of claim 8, further comprising assessing the confidence of the hybrid distance map by comparing the value of distances calculated in the hybrid distance map to a threshold distance value.

11. The method of claim 1, wherein the first plurality of pixels includes a feature pixel, and wherein the feature pixel corresponds to a feature of the first image.

12. The method of claim 11, wherein the first plurality of pixels are each represented by a color, and wherein the color of the feature pixel is darker than the color of each of the other pixels of the first plurality of pixels.

13. The method of claim 1, wherein the chamfer matching registration process includes registering the first input image with the second input image using four degrees of freedom of the endoscope, and wherein three or more of the four degrees of freedom is selected from the group comprising the advancement of the endoscope, the withdrawal of the endoscope, the rotation of the endoscope, the flex of the endoscope and the flex angle of the endoscope.

14. A method of combining multiple images of a body structure, the method comprising:
    using an image capture device of an endoscope to obtain a first image within a body lumen of a patient at a first time point and to obtain a second image within the body lumen of the patient at a second time point, wherein the image capture device is positioned at a first position when it captures the first image at the first time point, and wherein the image capture device is positioned at a second position when it captures the second image at the second time point, and wherein the second time point occurs after the first time point;

representing the first image with a first plurality of pixels;

representing the second image with a second plurality of pixels;

generating a first feature distance map of the first input image;

generating a second feature distance map of the second input image;

calculating the positional change of image capture device between the first time point and the second time point; and utilizing the first feature distance map, the second feature distance map and the positional change of image capture device to generate a three-dimensional surface approximation of the body structure within the body lumen of the patient;

wherein generating the first feature distance map includes assigning a numerical value to the one or more pixels of the first plurality of pixels;

wherein generating the second feature distance map includes assigning a numerical value to the one or more pixels of the second plurality of pixels; and wherein utilizing the first feature distance map, the second feature distance map and the positional change of the image capturing device to generate a three-dimensional surface approximation of the body structure includes calculating a transformation between the first input image and the second input image using a chamfer matching registration process.

15. The method of claim 14, wherein the first image corresponds to the body structure, and wherein generating the first feature distance map includes selecting one or more pixels from the first plurality of pixels, wherein the one or more pixels from the first plurality of pixels are selected based on their proximity to a features of the first image correlated to body structures.

16. The method of claim 15, wherein the one or more pixels from the first plurality of pixels are selected based on their proximity to a central longitudinal axis of the body structure.

17. The method of claim 16, wherein the second image corresponds to the body structure, and wherein generating the second feature distance map includes selecting one or more pixels from the second plurality of pixels, wherein the one or more pixels from the second plurality of pixels are selected based on their proximity to the central longitudinal axis of the body structure.

18. The method of claim 14, further comprising generating a hybrid feature distance map by registering the first feature distance map with the second feature distance map using a one or more degrees of freedom corresponding to a digital camera motion parameter and a scope state configuration parameter.

19. The method of claim 14, wherein the chamfer matching registration process includes registering the first input image with the second input image using four degrees of freedom of the endoscope, and wherein three or more of the four degrees of freedom is selected from the group comprising the advancement of the endoscope, the withdrawal of the endoscope, the rotation of the endoscope, the flex of the endoscope and the flex angle of the endoscope.

20. A system for generating a fused image from multiple images, comprising:

a processor; and a non-transitory computer-readable storage medium comprising code configured to perform a method of fusing images, the method comprising:

capturing a first input image containing a body structure with a digital camera positioned at a first location at a first time point;

representing the first image with a first plurality of pixels;

capturing a second input image containing the body structure with the digital camera positioned at a second location at a second time point;

representing the second image with a second plurality of pixels;

generating a first feature distance map of the first input image;

generating a second feature distance map of the second input image;

calculating the positional change of the digital camera between the first time point and the second time point; and utilizing the first feature distance map, the second feature distance map and the positional change of the digital camera to generate a three-dimensional surface approximation of the body structure, wherein generating the first feature distance map includes assigning a numerical value to the one or more pixels of the first plurality of pixels;

wherein generating the second feature distance map includes assigning a numerical value to the one or more pixels of the second plurality of pixels; and wherein utilizing the first feature distance map, the second feature distance map and the positional change of the digital camera to generate a three-dimensional surface approximation of the body structure includes calculating a transformation between the first input image and the second input image using a chamfer matching registration process.

* * * * *